United States Patent [19]

Johnston

[11] 3,815,075

[45] June 4, 1974

[54] TRIMMER POTENTIOMETER

[75] Inventor: Samuel Andrew Johnston, Fontana, Wis.

[73] Assignee: Bunker Ramo Corporation, Oak Brook, Ill.

[22] Filed: Nov. 3, 1971

[21] Appl. No.: 195,410

[52] U.S. Cl. .................. 338/159, 29/193.5, 29/613, 338/180, 338/183

[51] Int. Cl. ................................................ H01c 1/08

[58] Field of Search ........... 338/180, 159, 181, 183, 338/176, 174, 175, 162, 184; 29/610, 613, 619, 621, 193.5; 264/271, 272, 273

[56] References Cited

UNITED STATES PATENTS

| | | | |
|---|---|---|---|
| 2,118,267 | 5/1938 | Richter | 338/159 |
| 2,480,218 | 8/1949 | Burnell | 338/159 |
| 2,976,093 | 3/1961 | Reiling | 264/273 X |
| 3,050,704 | 8/1962 | Dickinson et al. | 338/180 |
| 3,187,289 | 6/1965 | Rolwes | 338/180 |
| 3,497,858 | 2/1970 | Norris | 338/180 |
| 3,500,281 | 3/1970 | Kirkendall | 338/180 |
| 3,550,059 | 12/1970 | Barden et al. | 338/183 X |
| 3,561,113 | 2/1971 | Burke | 29/621 |
| 3,611,061 | 10/1971 | Segerson | 29/193.5 X |

*Primary Examiner*—Bernard A. Gilheany
*Assistant Examiner*—D. A. Tone
*Attorney, Agent, or Firm*—Frederick M. Arbuckle

[57] ABSTRACT

A trimmer potentiometer of dual in-line character including a lead frame molded in an insulating envelope with extensions of the lead frame extending beyond the envelope forming heat and electrical conductive leads; the envelope is provided with openings for exposing contact areas of the lead frame for securement of elements of the electrical circuit of the potentiometer; the lead frame forms a heat sink for the electrical circuit elements, with the heat being dissipated through the leads; in the fabrication of the device, the lead frames of a plurality of the devices are included in a continuous strip which is cut to form the separate lead frames in a continuous operation in which the lead frames are molded in the envelopes.

19 Claims, 12 Drawing Figures

INVENTOR.
Samuel A. Johnston
BY Paul H. Gallagher
Att'y.

INVENTOR.
Samuel A. Johnston
BY
Paul H. Gallagher
Att'y.

TRIMMER POTENTIOMETER

OBJECTS OF THE INVENTION

A broad object of the invention is to provide a trimmer potentiometer of novel construction including a lead frame forming a heat sink for rapid dissipation of the heat developed in the potentiometer.

Another object is to provide a trimmer potentiometer having a base assembly as a major component thereof, wherein the base assembly includes a lead frame embedded in insulating material, except for certain small portions which are exposed, and electrical circuit elements secured to the lead frame at the exposed portions of the latter, the lead frame providing a heat sink of large size and capacity for rapidly dissipating the heat developed by the electrical circuit elements.

Another object is to provide a trimmer potentiometer of a construction which readily adapts itself to automatic fabrication of a base assembly of the potentiometer, which constitutes a major portion thereof.

A still further object is to provide a trimmer potentiometer of the foregoing general character which includes a base member or component made up of a lead frame embedded in an insulating envelope having novel construction and interrelation between the lead frame and envelope whereby to provide great strength in the base member.

Still another object is to provide a trimmer potentiometer of the character referred to immediately above, wherein the great strength is provided at least in part by interdigitated elements in the lead frame, and staking openings in the lead frame through which the material of the envelope extends and forms integral continuation of the material on opposite sides of the lead frame.

A still further object is to provide a trimmer potentiometer which includes a base member or component of the character referred to, to which electrical circuit elements are secured, this providing a novel arrangement wherein a common kind of base member may be provided and any of various kinds of electrical circuit elements secured thereto.

Still another object is to provide, in a trimmer potentiometer a base member including a lead fame embedded in an insulating envelope, and having leads extending beyond the envelope, wherein a plurality of leads are provided representing each intended connection of the lead frame, and more than necessary for each such connection, whereby certain of the leads at each intended connection can be removed after completion of the base member, leaving only one at each location according to the dimensions encountered in the installation thereof, whereby a plurality of base members may be provided of identical construction, and adapted to the corresponding assembling operation according to individual characteristics thereof.

A further object is to provide a trimmer potentiometer of the foregoing general character including a base member and a cover member together forming an interior space, and electrical circuit elements are placed in that space, including an element secured to the base member and a contact carrier movable therealong, wherein the contact carrier is guided along the cover member, maintaining great accuracy as between the contact carrier and the cover member.

A still further object is to provide a novel method of making a trimmer potentiometer.

Yet another, and more specific, object is to provide a novel method of making trimmer potentiometers which are well adapted to automatic manufacture, including making lead frames thereof from a continuous strip, and indexing the lead frames in the step of making base assemblies incorporating the lead frames and other elements.

DESCRIPTION OF A PREFERRED EMBODIMENT:

Figure 1:
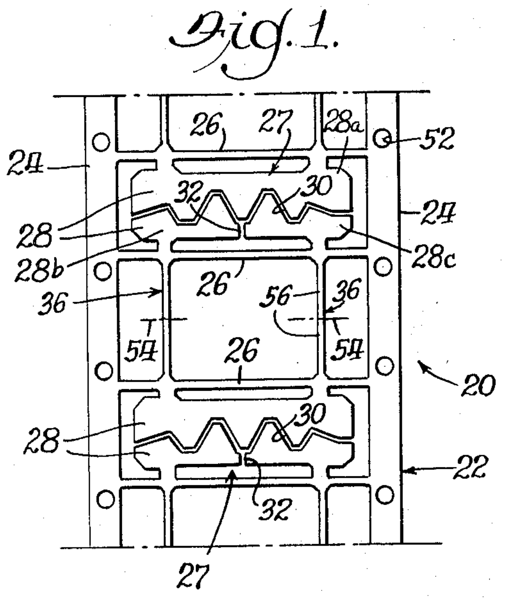
FIG. 1 is a face view of a continuous blank including a plurality of units or patterns forming lead frames and heat sinks utilized in making trimmer potentiometers of the present invention.

Referring in detail to the accompanying drawings, attention is directed first to FIG. 1 showing a blank 20 which is cut from a continuous strip of heat and electric conductive metal. The blank 20 includes a series of connected identical patterns 22, each of which is utilized in a base member of a potentiometer, and individually identified as Unit number 1, Unit number 2, etc.

The continuous blank after the cutting or blanking operation includes continuous longitudinal side strips 24 which are interconnected by transverse strips 26 utilized for stability of the blank in subsequent forming operations. In each pattern 22 or unit is a relatively broad, plate-like segment 27 forming a lead frame and the major portion of the heat sink, and separated into three sections 28 individually identified 28*a*, 28*b*, 28*c*. Section 28*a* extends the full length of the lead frame while the other sections 28*b*, 28*c* together extend the length of the first section 28*a*. The section 28*a* is separated from the other two sections by a parting line 30 while the sections 28*b*, 28*c* are separated by a parting line 32. A plurality of staking holes 34 are provided, there being at least one such hole in each of the sections. The blank also includes longitudinal strips 36 interconnecting with the transverse strips 26 and extending to and connected with respective ones of the sections 28*a*, 28*b*, 28*c*.

Figure 3:
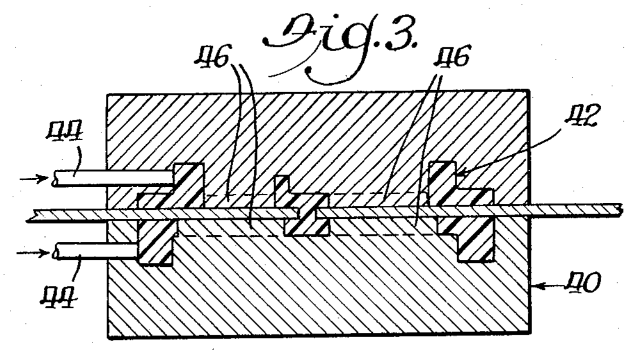
FIG. 3 is a sectional view through a mold and the portion of the base member included therein.

Each lead frame 27 is embedded or molded in an envelope or encasement 38 of electrical insulating material, such as a suitable plastic material capable of being molded. This envelope encloses all of the lead frame 27 plus short portions of the longitudinal strips 36. FIG. 3 is a cross sectional view of a suitable mold 40, shown in two parts applied to opposite sides of the lead frame 27, and including a cavity 42 into which the plastic material is injected through sprues 44. The mold halves include pins 46 which are dimensioned for engaging and pinching the lead frame 27 to form welding ports 48, 50, respectively on opposite sides of the envelope, exposing contact areas on the lead frame, utilized in securing electrical elements thereto. The ports 48, which are square are formed in the upper part of the envelope while the ports 50, which are round, are formed in the under part. The plastic material in the two halves of the mold flows through the staking holes 34 and through the parting lines 30, 32, and meets over the edges around the lead frame, forming a unitary and effectively integral base member composed of the molded plastic envelope and the lead frame.

The blank is provided with index holes 52, two in each of the side strips 22, four such holes preferably being located adjacent the corners of each lead frame 27. These holes are utilized for indexing the blanked strip in various steps in the fabrication and securement of elements in the final device.

Figure 7:
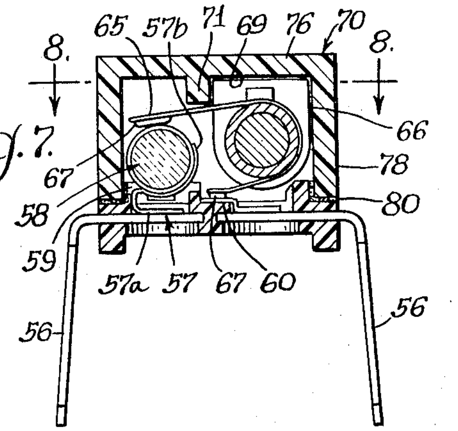
FIG. 7 is a sectional view taken at line 7—7 of FIG. 6.
Figure 8:
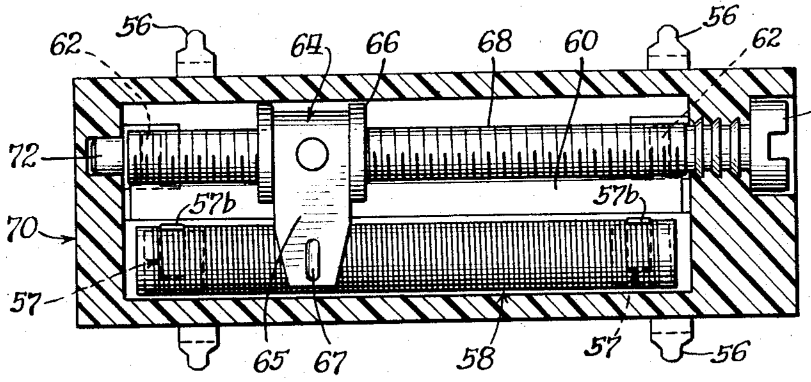
FIG. 8 is a sectional view taken at line 8—8 of FIG. 7.
Figure 6:
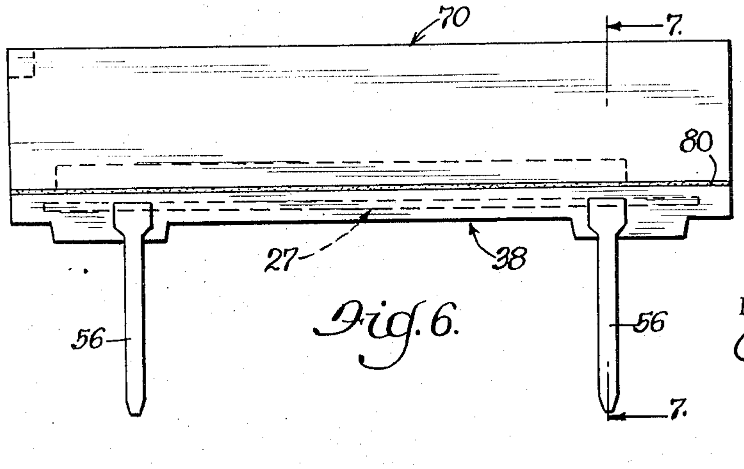
FIG. 6 is a side view of the completed potentiometer.

In the fabrication and final forming of the base member, the transverse strips 26 are trimmed at approximately the lines 53, and the longitudinal strips 36 are cut at lines 54 to form fingers now identified at 56 (FIGS. 6–8) which form leads in the finished device. However, that trimming operation is not performed until certain electrical elements are put in place on the base member, in order to utilize the indexing holes 52 in indexing the strip for positioning those electrical elements. Clips 57 (FIGS. 7, 8) are inserted in welding ports 48 associated with the sections **28*b*, 28*c*, and welded thereto. Each clip, as shown in FIG. 7, has a flat bottom portion 57*a* engaging the respective lead frame section 28*b*, 28*c*, and an upper curved portion 57*b*. A resistance element 58, in the present instance a coil, is secured to the clips in engagement with the curved portion 57*b*. Preferably the base member, in the molding thereof, is provided with longitudinal ribs 59** for cradling the resistance coil and providing stability thereto.

A commutator bar or strip 60 is similarly put in place, having extensions or clips 62 positioned in the welding ports 48 associated with the section **28*a* and welded thereto. The base member with the resistance coil and commutator bar thereon may for convenience be termed a base assembly. The welding ports 50** on the opposite side serve as a means for applying electrodes to the sections in the welding operations.

The resistance coil 58 and the commutator bar 60 extend substantially the full length of the lead frame 27 and a sliding contactor 64 is provided for making contact with the resistance coil and the commutator bar. This sliding contactor is mounted on a carrier 66 which in turn is threadedly mounted on a lead screw 68 and upon rotation of the lead screw the contact carrier and thus the sliding contact is moved along the resistance element 58 as well as the commutator bar 68, establishing a circuit between the two leads 56 on the one side related to the section **28*a*, and either one or the other of the leads 56 on the other side related to the sections 28*b*, 28*c*, according to the position of the sliding contact 64. The sliding contactor 64 preferably includes arms 65 of spring material and an intermediate looped portion, the arms having contact buttons 67 respectively engaging the resistance coil and the commutator bar. These contact buttons may be made of suitable material and form. If desired the carrier 66** may be heat swaged to the sliding contactor if desired to firmly secure the latter in position.

The lead screw 68, of known kind, is mounted in a cover member 70 to be referred to again hereinbelow, having one end journalled as at 72 in an end wall of the cover member and its other end rotatably mounted in the opposite end wall and having a head 74 exposed for manual manipulation for rotating the lead screw.

The cover member 70 may be of plastic material similar to that of the envelope, having a top element 76 and a surrounding wall member 78 forming the end walls referred to above and side walls and is fitted to a complementary edge surface on the envelope and secured thereto by a bonding tape 80.

The contact carrier 66 (FIG. 7) preferably is guided along a channel 69 in the cover, this channel being formed by an inwardly extending rib 71 and the corresponding wall element 78. This guidance minimizes tolerance buildup between the lead screw, the contact carrier and the cover, assuring greater accuracy.

The base member possesses great strength, particularly because of the great expanse of the lead frame 27 reaching nearly to the edges of the envelope. The fingers 33 provided by the irregular shape of the parting line 30 provide an interdigitation between the section **28*a* on the one side and the sections 28*b*, 28*c*** on the other side, providing great strength throughout the area of the lead frame, preventing the plastic material of the envelope from cracking or fracturing between the sections.

The construction lends itself particularly to automatic fabrication. The patterns 22 of the continuous blank facilitate the molding of the envelopes to the successive lead frames, the index holes 52 facilitating this operation. Additionally these same index holes are utilized to advantage in indexing the base members in applying the electrical circuit elements and particularly the clips 57, 62 in the welding ports 48.

The lead frame 27 being distributed throughout the greater portion of the base member forms a heat sink with the leads 56, providing rapid removal of heat from the device by way of the leads 56. The narrow dimension of the parting line 30 and the interdigitated elements 33 provide a low thermal resistance path from the sections **28*b*, 28*c* to the section 28*a* and the heat from the resistance element is dissipated through all sections and through all four leads 56. The long sections 28*a*** have electrical contact through two leads, and greater dissipation of heat. Greater power ratings are possible than has been heretofore possible in previously known devices.

When the device of the invention is utilized in a rheostat type application where power is normally dissipated in only a portion of the resistance element, the heat is distributed more uniformly over the entire device and hot spot temperature is reduced.

It may be desired to utilize a different form of resistance element than the coil 58, such for example as cermet or metal film resistance elements, and if such should be desired, either one can be substituted for the coil, providing another great advantage in that the base member and the cover may be provided as common items and in the final assembly such element be substituted instead of the coil, this resulting in reduced manufacturing costs.

Figure 11:
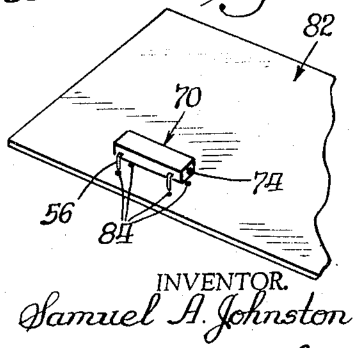
FIG. 11 is a perspective view of the completed potentiometer in relation to a PC board in which it is to be mounted.
Figures 2, 4, 10:
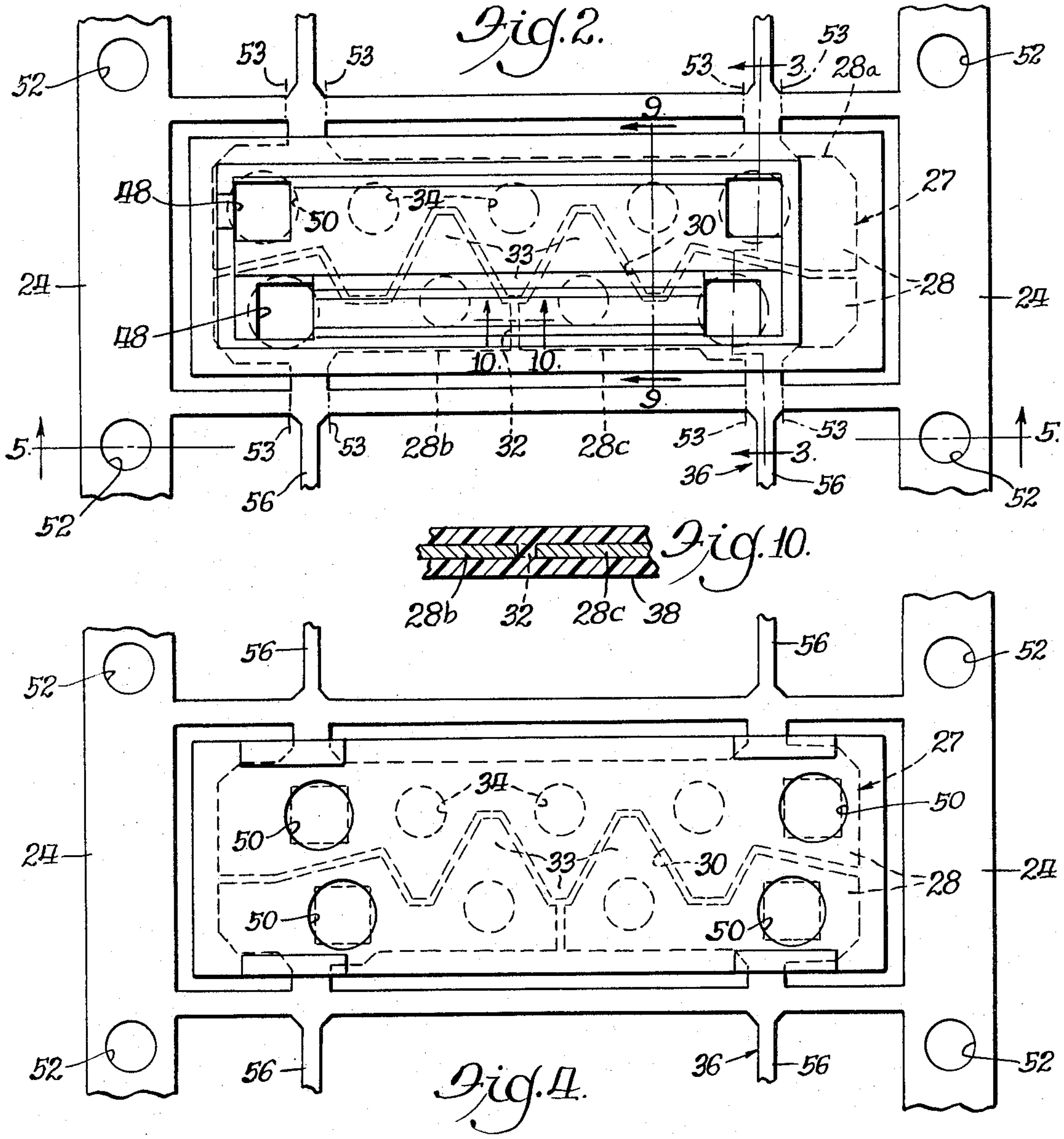
FIG. 2 is a face view of one unit of the blank of FIG. 1 and showing an envelope of insulating material thereon together with the embedded portion of the lead frame of the blank forming a base member utilized in the potentiometer.
FIG. 4 is a face view of the reverse side of FIG. 2.
FIG. 10 is a sectional view taken at line 10—10 of FIG. 2.
Figure 5:
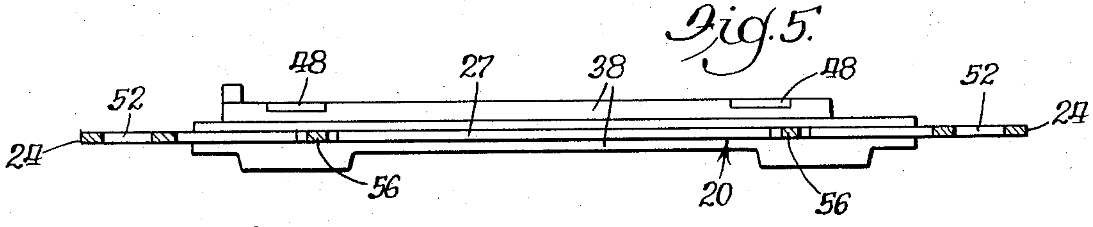
FIG. 5 is an edge view of the unit shown in FIG. 2 oriented according to line 5—5 of FIG. 2.
Figure 9:
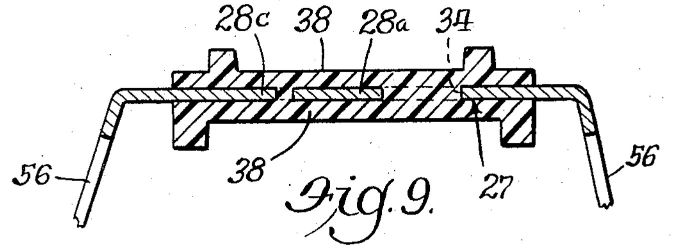
FIG. 9 is a sectional view taken at line 9—9 of FIG. 2.

FIG. 11 represents a step in mounting the completed potentiometer on a PC board 82. The fingers or leads 56, in the fabrication of the device, are bent transverse to the base member and are inserted in apertures 84 in the PC board and are clinched over on the opposite sides in contact engagement with conductive elements on the PC board, this latter step being a known step.

Figure 12:
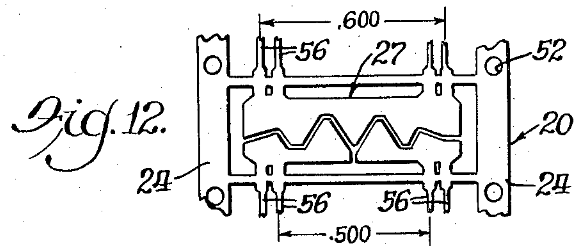
FIG. 12 is a face view of one blank unit, similar to that of FIG. 1 but showing a plurality of fingers of the lead frame at each intended electrical connection.

FIG. 12 represents a device made according to the foregoing, but instead of only four leads 56, for engagement at four locations on the PC board, it is provided with eight such leads, two at each of the four corners. A very common spacing between the leads longitudinally of the potentiometer, may be for example 0.500 inch but other spacing may be desired alternatively, such as 0.600 inch. The device may be made with leads at both of those spacings and the ones that are not to be used, according to the desired spacing, are merely trimmed off, and thus the device is made precisely in the same manner as disclosed above with that single exception, and again an advantage is provided in manufacturing costs.

I claim:

1. A base member for a trimmer potentiometer comprising, a lead frame of heat and electrical conductive material generally embedded in an envelope of insulating material, the lead frame having leads extending therefrom beyond the envelope and together with those leads forming a heat sink, and having contact areas exposed through the envelope in relation to respective ones of the leads.

2. A base member according to claim 1, wherein the insulating material and the embedded portion of the lead frame together form a main portion generally thin and of substantial length and breadth, and further wherein the lead frame has staking openings therein through which the insulating material extends and is of integral composition through those openings and on both sides of the lead frame.

3. A base member according to claim 2 wherein the insulating material extends peripherally beyond the embedded portion of the lead frame and forms integral continuation from opposite sides of the embedded portion and peripherally around the edges thereof.

4. A base member according to claim 3 wherein the lead frame is formed in sections related to respective ones of the leads, and the parting lines between the sections form staking openings.

5. A base member according to claim 1 wherein the lead frame is composed of separate sections related to respective ones of the leads, and the sections on opposite sides of the lead frame are separated by an irregular parting line forming interdigitated elements having common projection of substantial extent transverse to the general direction of the parting line.

6. A base member according to claim 1 wherein the main portion as defined by the insulating material is of substantial length and lesser width, the lead frame is made up of sections, one of which is long and positioned on one side and extends the greater part of the length of the insulating material, and a pair of short sections on the other side separated from the long section and separated from each other and together extending substantially the length of the long section, the leads include two secured to the long section and one secured to each of the other two sections, and the exposed contact areas include two related to the leads of the long section, and one related to the lead of each of the shorter sections.

7. A base assembly for a trimmer potentiometer comprising a base member according to claim 1 wherein the lead frame is made up of separate sections, in conjunction with electrical circuit elements mounted on the base member and secured to respective ones of the lead frame in said exposed contact areas and extending along the base member between respective ones of those contact areas.

8. A base assembly according to claim 7 wherein the electrical circuit elements include a commutator bar having contact engagement with at least one contact area, and a resistance element having engagement at opposite ends in two of said contact areas.

9. A base assembly according to claim 8 wherein the means for mounting the resistance element includes clips secured to the resistance element and welded to the lead frame in the respective exposed contact areas, and the envelope includes longitudinal ribs engaged by the main portion of the resistance element, and the means for mounting the commutator bar includes clips welded to the lead frame in the respective exposed areas and a longitudinal ledge on the envelope supporting the main portion of the commutator strip.

10. A trimmer potentiometer including a base assembly according to claim 8 and including a sliding contactor in engagement with the resistance element and commutator bar, a contact carrier carrying the sliding contactor, and means mounting the contact carrier for adjusting movements along the resistance element and commutator bar with said contactor in constant engagement therewith.

11. A potentiometer according to claim 10 and wherein the means for moving the contact carrier includes a lead screw, and the potentiometer includes means mounting the lead screw for rotational movement for thereby moving the contact carrier therealong, the lead screw having an end adapted for manual rotation of the lead screw.

12. A potentiometer according to claim 11 and including a cover member mounted on the base member and forming an interior space therewith, and the resistance element, the commutator bar, a sliding contactor, the contact carrier and the major portion of the lead screw being contained in said space, and the lead screw being mounted in opposite end walls of the cover member.

13. A trimmer potentiometer comprising a base member including a lead frame and leads extending to the exterior for external connection, a cover member mounted on and secured to the base member and together therewith forming an interior space, a resistance element mounted in said space and connected with respective ones of said leads, a commutator bar within said space, a sliding contactor in engagement with the resistance element and the commutator bar, a contact carrier carrying the sliding contactor, a lead screw in said space and rotatably mounted in said cover member and mounting said contact carrier and sliding contactor and exposed to the exterior of said space for manual adjusting movements for moving the contact carrier and sliding contactor along the resistance element and commutator bar, and channel means in the interior of the cover member receiving said contact carrier and guiding the latter along the channel in the movements of the contact carrier responsive to adjusting movements of the lead screw, wherein the contactor includes arms of spring material and carrying contact buttons for respectively engaging the resistance element and commutator bar, and an intermediate looped portion mounted directly on the contact carrier, and the sliding contactor and contact carrier have rigid interengagement for retaining the contact buttons on the arms in constant engagement with the resistance element and commutator bar.

14. A method of making a base member of a trimmer potentiometer comprising the steps, providing a continuous strip of conductive metal, blanking the strip and cutting out portions thereof to form a series of identical patterns therein while leaving the patterns continuously connected, embedding only a portion of each pattern in an envelope of insulating material while leaving contact areas of the embedded portion exposed through the envelope, and trimming a part of the non-embedded portion of the pattern to leave leads extending beyond the envelope.

15. A method according to claim 14 and including the step of forming the envelope by molding material around the portion of the pattern to be embedded.

16. A method according to claim 15 and including the step of utilizing a mold having pins pinchingly engaging the part of the pattern to be embedded on opposite sides thereof and presenting a cavity to the remaining portion of the part to be embedded, and thereby forming the exposed contact areas.

17. A method according to claim 16 and including the step of providing index holes in the marginal side strips for use in locating the wide area portion in that step and in subsequent manufacturing steps.

18. A method of making a base assembly of a trimmer potentiometer including the method of making a base member according to claim 17 and including the further steps of applying electrical circuit elements to the base member, and utilizing the index holes for indexing the base member in applying such electrical circuit elements.

19. A method of forming base assemblies for a plurality of trimmer potentiometers comprising the steps, making a plurality of identical base members, each including a lead frame generally embedded in an envelope of insulating material with leads extending to the exterior and having contact areas exposed through the envelope, and applying electrical circuit elements of different kinds to selected ones of the base members, whereby of the plurality of such potentiometers the base members are all identical but the completed potentiometers are of different characteristics according to the different electrical circuit elements applied thereto.

* * * * *